Dec. 29, 1953  R. W. THOMSON  2,663,974
APPARATUS FOR BENDING GLASS SHEETS
Filed July 23, 1951  2 Sheets-Sheet 1
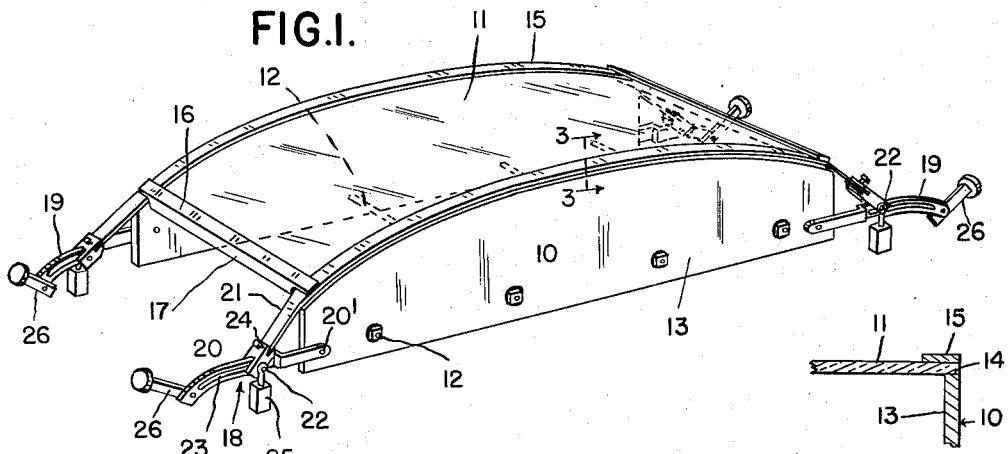
FIG.1.
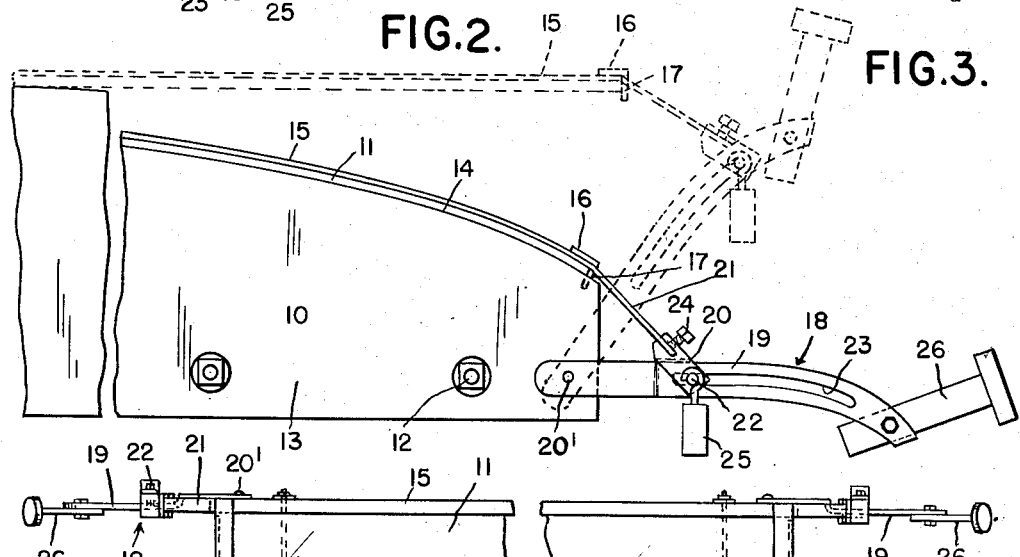
FIG.2.  FIG.3.
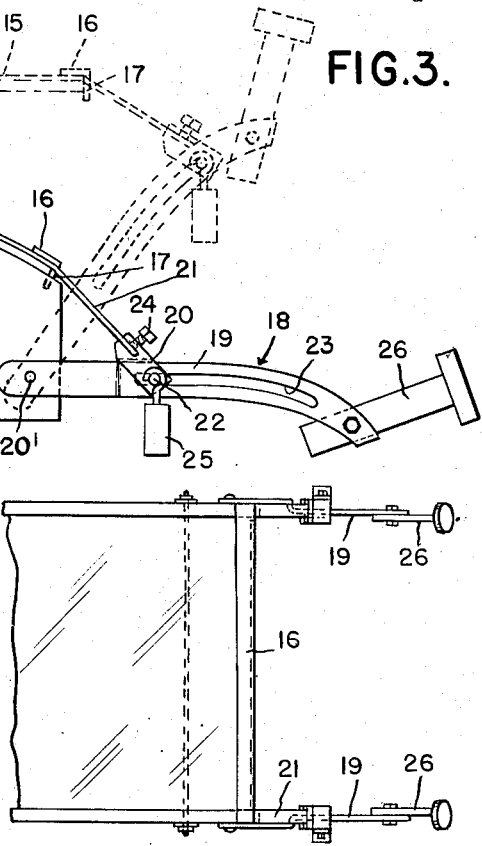
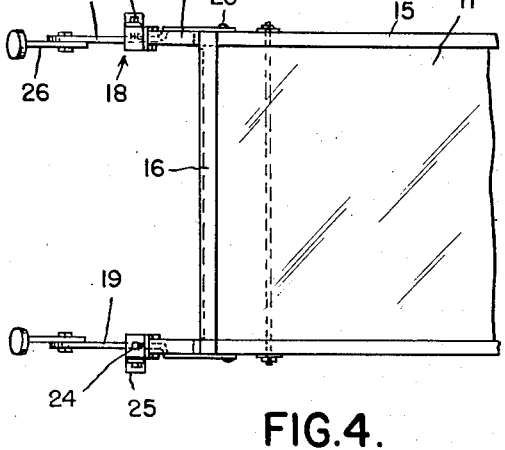
FIG.4.
INVENTOR.
ROBERT W. THOMSON
BY
ATTORNEYS Dec. 29, 1953  R. W. THOMSON  2,663,974
APPARATUS FOR BENDING GLASS SHEETS
Filed July 23, 1951  2 Sheets-Sheet 2
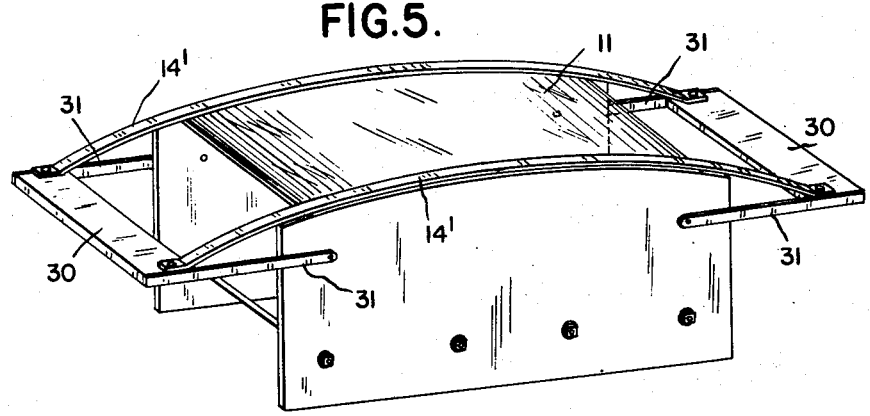
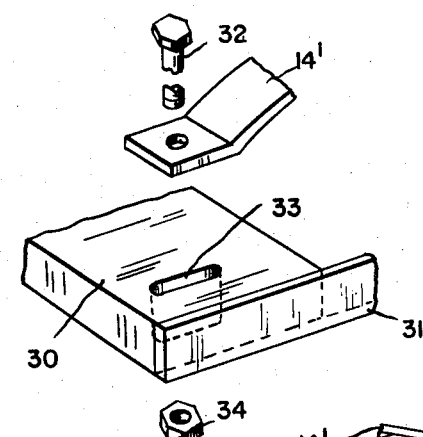
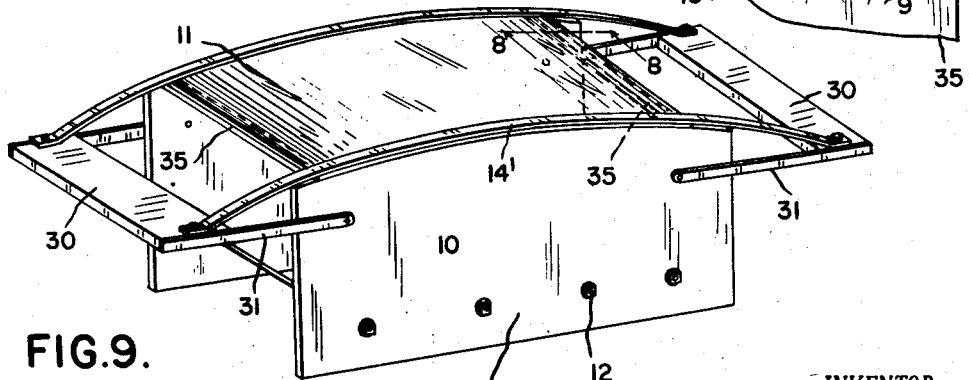
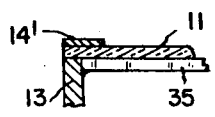
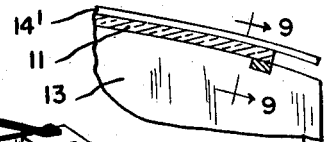
INVENTOR.
ROBERT W. THOMSON
BY
ATTORNEYS Patented Dec. 29, 1953

2,663,974

UNITED STATES PATENT OFFICE 2,663,974

APPARATUS FOR BENDING GLASS SHEETS

Robert W. Thomson, Riverside, Ontario, Canada, assignor to Motor Products Corporation, Detroit, Mich., a corporation of New York Application July 23, 1951, Serial No. 238,107

13 Claims. (Cl. 49—67)

This invention relates to apparatus for bending a sheet of heat softenable material such, for example, as glass to a predetermined curved contour.

It is an object of this invention to provide an improved apparatus rendering it possible to bend glass sheets of substantial size to a curved contour on a large volume production basis without marking, distorting or affecting the true optical characteristics of the glass.

In accordance with this invention, a sheet of glass is placed on a form which is preferably of the skeleton type comprising laterally spaced side members having the top edge portions convexedly curved in a longitudinal direction and forming supporting surfaces for respectively engaging the underside of the glass sheet adjacent its opposite side edges. The top surface of the glass sheet in the region of the supporting surfaces is engaged by a pair of flexible strips which are normally straight, but possess sufficient flexibility to conform to the contour of the supporting surfaces. One or both ends of each strip are respectively engaged by means which acts through the strips to apply a continuous downwardly directed pressure on opposite side edge portions of the glass sheet throughout the length of the latter to assist bending of the heated glass sheet to the contour of the supporting surfaces on the form.

Under the above conditions the glass sheet may be heated to somewhat lower temperatures and at the same time will more readily bend to the contour of the form. Thus the rate of production for equipment of a given size is not only increased but the cost of manufacture is reduced. Moreover, due to the somewhat lower bending temperatures, there is less chance for the glass sheet to become marked during the bending operation by either the strips or supporting surfaces on the form.

Also, when the temperature of the glass is maintained relatively low there is less tendency for the glass sheet to sag or deform during the bending operation, and any tendency for the sheet to bow upwardly as a result of the action of the flexible strips is overcome by initially applying only a slight downward pull on the strips and gradually increasing this pull as the extent of curvature of the glass sheet increases.

The foregoing, as well as other objects, will be made more apparent as this description proceeds especially when considered in connection with the accompanying drawings wherein:

Fig. 1 is a perspective view of a form constructed according to the present invention for bending sheets of heat softening material such, for example, as glass;

Fig. 2 is a fragmentary side elevational view of one end of the form shown in Fig. 1;

Fig. 3 is a sectional view taken on the line 3—3 of Fig. 1;

Fig. 4 is a plan view of the construction shown in Fig. 2;

Fig. 5 is a perspective view of a modified construction of a glass bending form;

Fig. 6 is an exploded perspective view of a part of the form shown in Fig. 5;

Fig. 7 is a perspective view of still another embodiment of this invention;

Fig. 8 is a sectional view taken on the line 8—8 of Fig. 7; and

Fig. 9 is a sectional view taken on the line 9—9 of Fig. 8.

Referring first to the embodiment of the invention shown in Figures 1 to 4 inclusive, the reference numeral 10 designates a form of the skeleton type over which a sheet of glass 11 or some equivalent heat softenable material may be bent to a predetermined curvature. The form 10 has laterally spaced vertical side members or walls 13 connected together by the rods 12. The top edges of the side members 13 are convexedly curved in the direction of length of the members and provide relatively narrow supporting surfaces or seats 14 having a length at least as great as the length of the sheet 11 or glass to be bent. The lateral spacing of the side members 13 is so determined with respect to the width of the sheet 11 to be bent that the seats 14 respectively engage the underside of the sheet adjacent opposite side edges thereof.

In practice, the bending form 10 with a sheet 11 of glass to be bent in position thereon, are passed through a tunnel-type kiln or leer (not shown) in a manner well known in the trade to successively heat and gradually cool the sheet 11 preferably in one continuous operation. The temperature to which the glass sheet 11 is heated and the length of time the sheet is exposed to this temperature is regulated so that the sheet conforms closely to the curvature of the seats 14 on the form 10 during its travel through the kiln or leer.

While the temperature to which the sheet 11 is heated may vary depending upon conditions generally and the composition of the glass, nevertheless, the maximum temperature is preferably well below the critical annealing range, approximately 1050 degrees F. for the type of glass generally employed for producing windshields. In cases where gravity alone is relied upon to bend the heated glass sheet 11 to the contour of the form 10, it is usually necessary to heat the sheet to higher temperatures and/or prolong the period the sheet is exposed to the elevated temperature. Heating the glass sheet 11 to temperatures approaching the critical annealing range for prolonged periods influences bowing or sagging of the sheet between the seats 14, and has a tendency to mark or otherwise deform the sheet 11 during the bending operation.

The present invention renders it possible to bend the sheet 11 of glass to the curvature of the seats 14 in a shorter period and at lower temperatures so that the rate of production is not only increased at a reduced cost, but the tendency for the sheet to sag, bow or otherwise distort during the bending phase is minimized. For accomplishing this result a pair of normally substantially straight flexible strips 15 are respectively supported above the seats 14 and extend for at least the full length of the seats 14. The strips 15 are sufficiently flexible to enable bending the same to the contour of the seats 14 and are positioned to engage the top surface of the sheet 11 in substantial vertical alignment with the respective seats 14. If desired the strips 15 may be connected adjacent opposite ends by cross bars 16 having downwardly extending flanges 17 forming abutments for opposite ends of the sheet 11.

The bending form 10 has means indicated generally by the numeral 18 which act on opposite ends of the flexible strips 15 to bend the strips to the curvature of the seats 14 on the form and in practice cause the strips 15 to apply a downward pressure on the top surface of the sheet 11 directly opposite the seats 14. This downward pressure is applied continuously along the length of opposite side edges of the sheet 11 and assists materially in bending the sheet 11 to the curvature of the seats 14. Under such conditions it is possible to more readily bend the sheet 11 to the contour of the form at temperatures somewhat lower than heretofore employed where gravity alone is relied upon to accomplish the bending operation.

The means 18 comprises arms 19 having the inner ends supported on the walls or members 13 adjacent opposite ends of the latter by pins 20' having their axes extending generally perpendicular to the walls to permit swinging movement of the arms 19 in substantially vertical planes. Connectors 20 are respectively supported on the arms 19 for sliding movement lengthwise of the arms and are respectively connected to the ends of the strips 15. In this connection attention is called to Figure 1 of the drawings wherein it will be noted that the flanges 17 on the cross bars 16 are cut away at the extremities to provide clearance for the strips 15. In detail, the connectors having bifurcated parts which respectively straddle the arms 19 and are pivoted to the arms by pins 22. The pins 22 project freely through longitudinal slots 23 formed in the arms 19 and permit sliding movement of the connectors 20 lengthwise of the arms. The connectors 20 also have slots for respectively receiving the outer ends of the flexible members 21 and the latter are fastened to the connectors by set screws 24.

At the start of the bending operation or, in other words prior to bending the sheet of glass 11, the arms 19 assume the positions thereof indicated by the broken lines in Figure 2 of the drawings and the connectors 20 assume positions adjacent the outer ends of the arms 19. The connectors 20 are urged downwardly relative to the respective arms 19 by the action of gravity and weights 25 may be suspended from the pins 22 to insure downward displacement of the connectors 20 as the sheet 11 is bent to the curvature of the seats 14. The free ends of the arms 19 beyond the outer ends of the slots 23 are also weighted as at 26 and this additional weight tends to swing the arms 19 downwardly and outwardly about the respective pivots 20'. This downward force applied to the arms 19 tends to bend the flexible strips 15 to the contour of the seats 14 and in so doing exerts downward pressure along opposite side edges of the sheet 11. Since the sheet 11 is heated to the softening point it is readily bent to the curvature of the seats 14 under the influence of the weighted arms 19 and the latter swing downwardly about the pivots 20' toward the full line positions shown in Fig. 2 of the drawings. It will be noted that during the initial bending operation the mechanical advantage provided by the weighted outer ends of the arms 19 is at a minimum due to the relationship between the weighted outer ends of the arms 19 and the axis of the pivots 20'. However as bending of the sheet 11 continues the mechanical advantage progressively increases and the bending pressure applied to the sheet by the strips 15 also increases. Thus the bending pressure applied to the sheet 11 by the strips 15 is regulated so that bending of the sheet to the curvature of the form is accomplished without marking the sheet or causing the sheet to bow between the seats 14.

The embodiment of the invention shown in Figures 5 and 6 of the drawings differs from the one shown in Figures 1 to 4 inclusive in that the opposite ends of the strips 14' project beyond opposite ends of the form and are connected together by weights 30. The opposite ends of the weights 30 are respectively pivotally connected to the side walls of the form by arms 31.

As shown in Figure 6 of the drawings the opposite ends of the strips 14' are respectively fastened to the weights 30 by bolts 32 which extend through slots 33 in the weights and are threadably engaged by nuts 34. The slots 33 are elongated in the direction of length of the strips 14' and are of sufficient length to permit the required displacement of the ends of the strip 14' relative to the weights 30 during bending of the sheet 11.

The modification shown in Figures 7, 8 and 9 is similar to the one shown in Figures 5 and 6, and the same reference numerals are used to designate corresponding parts. The principal difference between the two constructions is that in the embodiment shown in Figures 7, 8 and 9 opposite ends of the glass sheet 11 are supported by cross braces 35 which extend between the walls or members 13 adjacent opposite ends thereof in positions to form seats for engagement with the underside of the sheet after it is bent to the curvature of the form. The seats or cross braces 35 assist in preventing sagging of the sheet 11.

It will be understood from the foregoing that the forms previously described may be used for simultaneously bending a plurality of superposed sheets of glass, if desired.

What I claim as my invention is:

1. Apparatus for bending sheets of heat softenable material comprising a form having side members spaced laterally from one another a distance less than the width of a sheet of material to be bent and having rigid convexedly curved supporting surfaces respectively engageable with the underside of the sheet adjacent its side edges, a pair of flexible strips conformable to the curved contour of the supporting surfaces and respectively spaced above the supporting surfaces for engagement with the top surface of the sheet in the region of the supporting surfaces, and means acting on the flexible strips tending to bend the latter to the contour of said supporting surfaces.

2. The apparatus defined in claim 1 wherein opposite ends of the flexible strips respectively project beyond the ends of the supporting surfaces on the members, and wherein the means for bending the strips to the contour of said supporting surfaces comprise weights respectively acting on opposite ends of the strips.

3. Apparatus for bending sheets of heat softenable material comprising a form having side members spaced laterally from one another a distance less than the width of a sheet of material to be bent and having convexedly curved supporting surfaces respectively engageable with the underside of the sheet adjacent its side edges, a pair of flexible strips conformable to the curved contour of the supporting surfaces and respectively spaced above the supporting surfaces for engagement with the top surface of the sheet in substantial vertical alignment with the supporting surfaces, arms having the inner ends respectively pivotally supported on the members adjacent opposite ends of the latter for vertical swinging movement and having the outer ends respectively projecting beyond opposite ends of the form, and weights at the outer ends of the arms respectively connecting the arms to opposite ends of the strips tending to bend the strips to the contour of said supporting surfaces.

4. The apparatus defined in claim 3 wherein the weights are in the form of cross members respectively connecting adjacent ends of the strips together.

5. Apparatus for bending sheets of heat softenable material comprising a form having side members spaced laterally from one another a distance less than the width of a sheet of material to be bent and having convexedly curved supporting surfaces respectively engageable with the underside of the sheet adjacent its side edges, a pair of normally substantially straight strips having sufficient flexibility to conform to the curved contour of the supporting surfaces and respectively spaced above said supporting surfaces for engagement with the top surface of a sheet of material in substantial vertical alignment with the supporting surfaces, and a weight connected to at least one end of each strip and acting on the strips tending to bend the latter to the contour of said supporting surfaces.

6. The apparatus defined in claim 5 comprising arms having the inner ends respectively pivotably supported in the members for vertical swinging movement, and having means for respectively supporting the weight on the arms for sliding movement lengthwise of the arms.

7. Apparatus for bending sheets of heat softenable material comprising a form having side members spaced laterally from one another a distance less than the width of a sheet of material to be bent and having rigid convexedly curved supporting surfaces respectively engageable with the underside of the sheet adjacent its side edges, a pair of normally substantially straight strips having sufficient flexibility to conform to the curved contour of the supporting surfaces and respectively spaced above said supporting surfaces for engagement with the top surface of a sheet of material in the region of the supporting surfaces, means connected to at least one end of each strip and exerting a pull on said ends in a direction which tends to conform the strips to the contour of the supporting surfaces.

8. The apparatus defined in claim 7 having means for gradually increasing the downward force applied on the strips as said ends of the strips move downwardly from their straight line positions toward the curved supporting surfaces.

9. Apparatus for bending sheets of heat softenable material comprising a form having side members spaced laterally from one another a distance less than the width of a sheet of material to be bent and having convexedly curved supporting surfaces respectively engageable with the underside of the sheet adjacent its side edges, a pair of normally substantially straight strips having sufficient flexibility to conform to the curved contour of the supporting surfaces and respectively spaced above said supporting surfaces for engagement with the top surface of a sheet of material in substantial vertical alignment with the supporting surfaces, means respectively connected to opposite ends of the strips and exerting a pull on said ends in a direction which conforms the strips to the contour of the supporting surfaces, and means for progressively increasing the pull applied to the ends of the strips as said ends move in a direction toward the curved supporting surfaces.

10. Apparatus for bending sheets of a heat softenable material comprising a form having side members spaced laterally from one another a distance less than the width of a sheet of material to be bent and having convexedly curved supporting surfaces respectively engageable with the underside of the sheet adjacent its side edges, a pair of normally straight strips having sufficient flexibility to conform to the curved contour of the supporting surfaces and respectively spaced above said supporting surfaces for engagement with the top surface of a sheet of material in substantially vertical alignment with the supporting surfaces, arms having their inner ends respectively pivotally supported on the members adjacent opposite ends of the latter and extending upwardly to positions adjacent the ends of the strips, and connectors respectively supported on the outer ends of the arms for sliding movement relative to the arms in a downward direction and respectively connected to the ends of the strips.

11. The apparatus defined in claim 10 having weights respectively secured to the outer ends of the arms for swinging the arms downwardly in a direction away from the respective ends of the strips and thereby applying a pull on the ends of the strips in a direction to conform the latter to the curved contour of the supporting surfaces.

12. Apparatus for bending sheets of heat softenable material comprising a form having a rigid contoured supporting surface extending continuously in one direction and engageable throughout the extent thereof by the underside of a sheet of heat softenable bendable material, means to assist in bending the sheet of material to the contour of the supporting surface including a flexible strip extending along the contoured supporting surface in opposed relation thereto and conformable to the contour of the supporting surface, said flexible strip being positioned for engagement with the top surface of the sheet of material throughout substantially the length of said contoured supporting surface, and means acting on said flexible strip tending to bend the latter to the contour of said supporting surface.

13. The apparatus defined in claim 12 wherein the means acting on the flexible strip comprises a weight connected to one end of the strip.

ROBERT W. THOMSON.

References Cited in the file of this patent

UNITED STATES PATENTS

| Number | Name | Date |
|---|---|---|
| 1,889,881 | Thompson | Dec. 6, 1932 |
| 1,999,558 | Black | Apr. 30, 1935 |
| 2,223,123 | Owen | Nov. 26, 1940 |
| 2,330,349 | Galey | Sept. 28, 1943 |
| 2,348,887 | Drake | May 16, 1944 |
| 2,370,827 | Weichbrodt et al. | Mar. 6, 1945 |
| 2,377,849 | Binkert et al. | June 12, 1945 |